William Bindszus
INVENTOR

William Bindszus
INVENTOR
BY M. Bjorndal
ATTORNEY 3,304,660
AUTOMATIC CUTTER GRINDER
William Bindszus, 140 Hepburn Road, Apt. 19G,
Clifton, N.J. 08809
Filed July 9, 1964, Ser. No. 381,432
2 Claims. (Cl. 51—56)

This invention relates to automatic cutter grinders of the type which will grind milling cutters and slitting saws on both sides at a compound angle at the same time, and specifically it refers to improvements in the machine which will make the grinding operation an automatic or a semi-automatic one as desired.

In machine-shop practice, milling cutters are an extremely important, expensive, and expendable tool. The grinding of such cutters, therefore, represents an operation of considerable economic significance in relation to the economy of the machine-shop operation. Heretofore, cutter grinders have been complicated to set up and required expert tool makers and operators. A great deal of time was lost in setting up the machine. Also it was not possible to grind more than one side of a cutter at one time. The cost of the operation was, therefore, often too high and affected the price of the article to be made. To eliminate this situation, I have invented a machine which is simple to set up and semi-automatic, or automatic in operation.

The main object of my invention is to provide an automatic cutter grinder which will grind both sides of a milling cutter at a compound, or under-cut angle at the same time.

Another object of my invention is to provide a cutter grinder which is easily set up for any type of cutter to be ground.

Still another object of my invention is to provide an automatic cutter grinder which will run automatically once started so that the operator may set up another machine in the meantime, or perform another operation.

An ancillary object of my invention is to provide an automatic cutter grinder which can be manufactured and operated at low cost.

Other objects and advantages of my invention will be apparent during the course of the following description.

Figure 1:
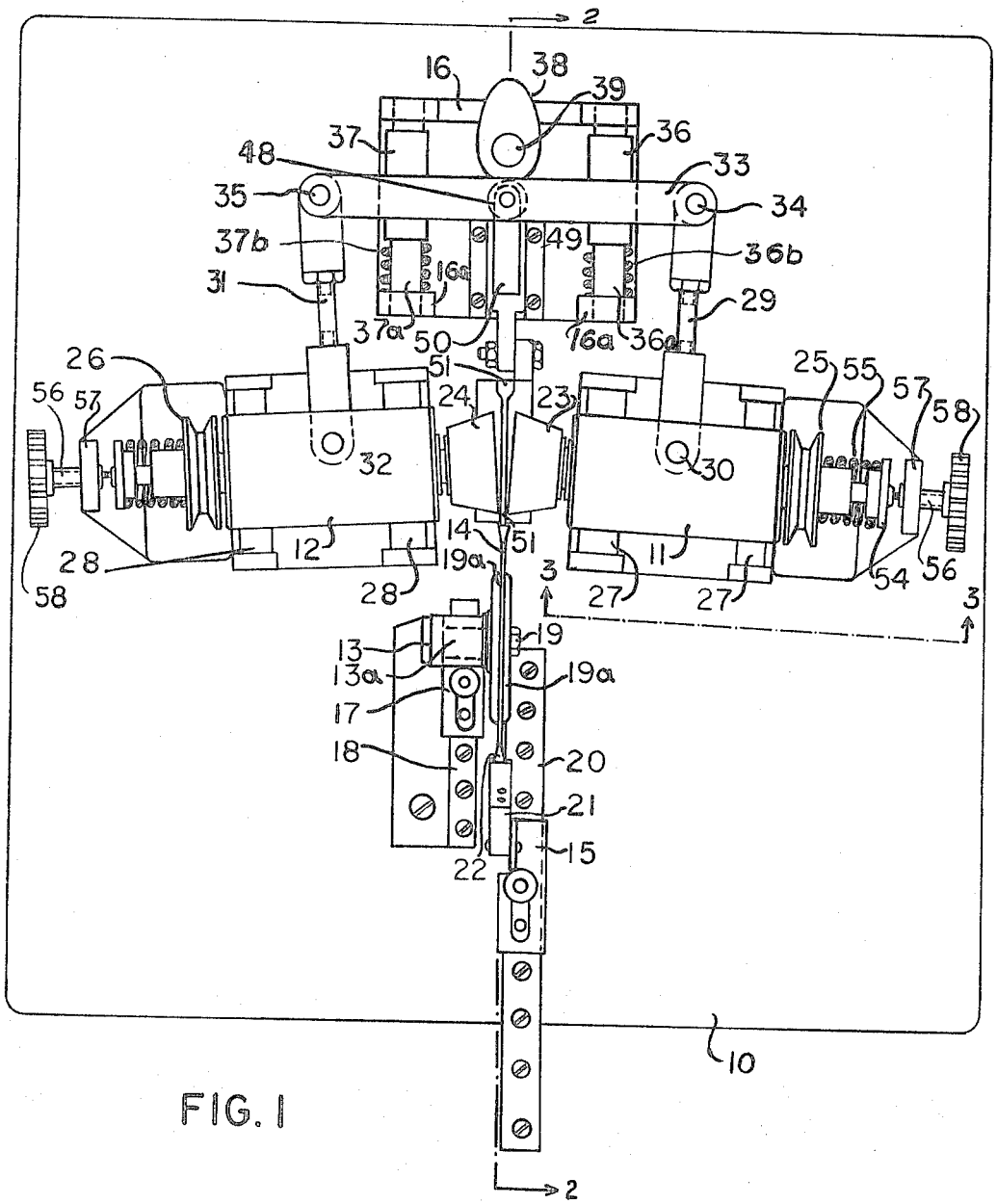
Figure 2:
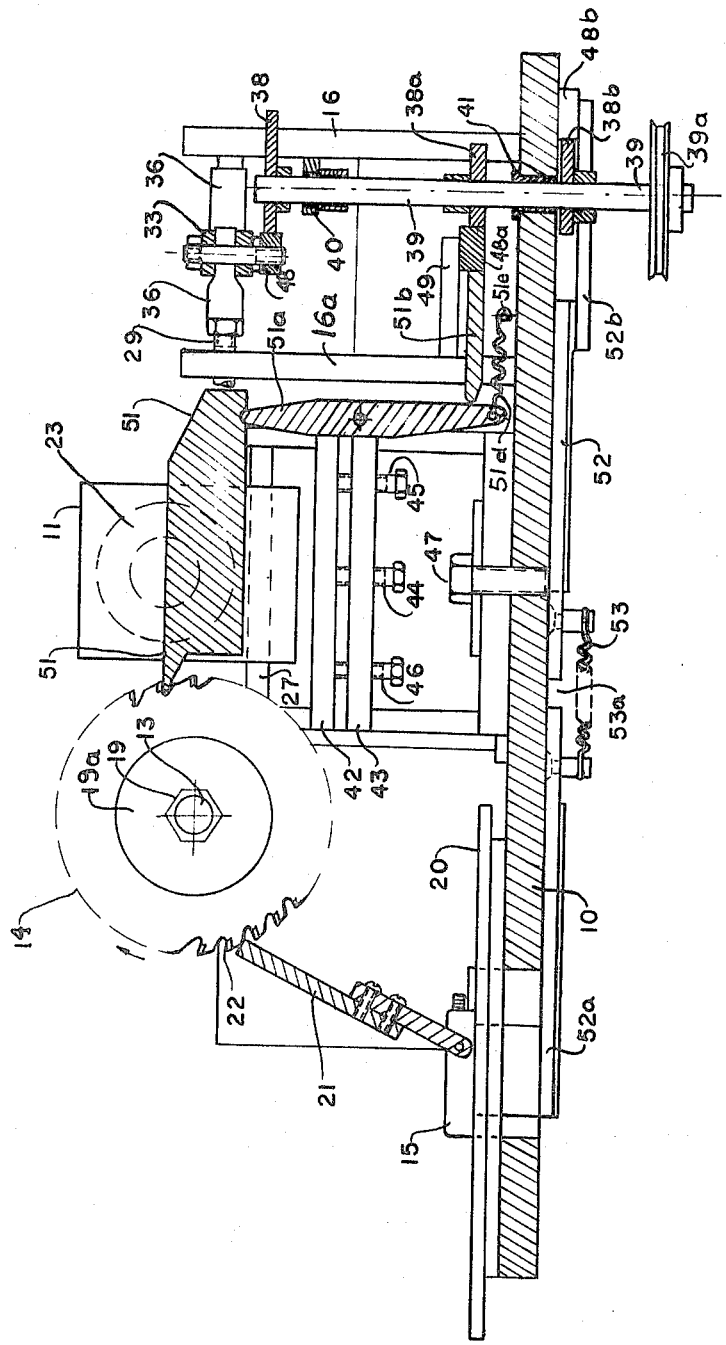
Figure 3:
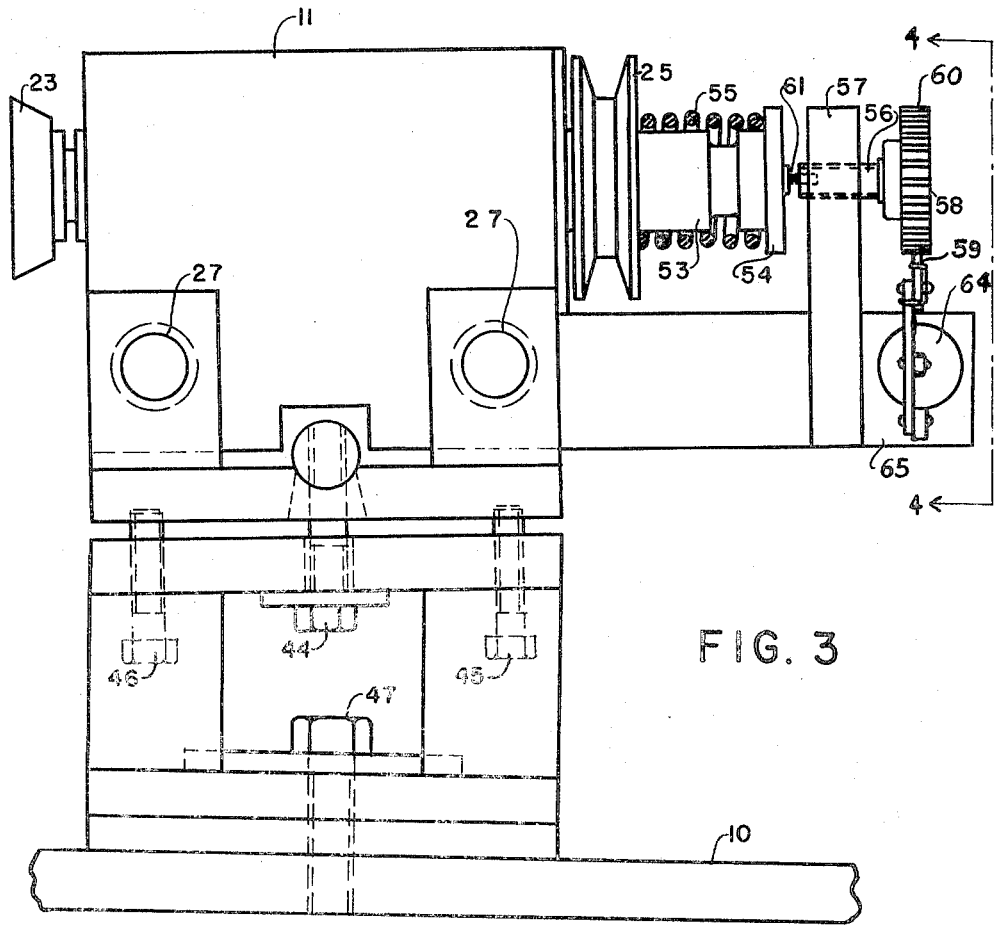
Figure 4:
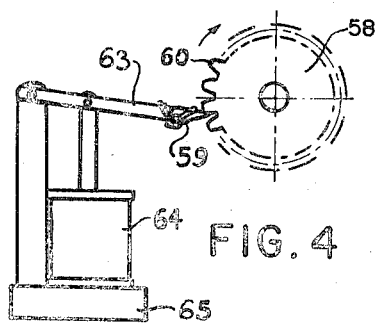

In the accompanying drawings forming a part of this specification, and in which like numerals are employed to designate like parts throughout the same, FIG. 1 is a horizontal plane view of a cutter grinder embodying my invention, FIG. 2 represents a side elevation of the same, FIG. 3 is a partial elevation taken along line 3—3 in FIG. 1, and FIG. 4 is a partial elevation taken along line 4—4 in FIG. 3.

In the drawing, wherein for the purpose of illustration is shown a preferred embodiment of my invention, the cutter grinder is mounted upon machine table 10 and consists basically of the following units: Two similar, movable, separate motor-driven grinding heads 11 and 12; an adjustably mounted rotatable arbor 13 on which is mounted the cutter 14 to be ground; the adjustable indexing device 15, and the cam drive 16 which alternately swings the two grinding heads 11 and 12 into the grinding position.

The arbor 13 is mounted and the bearing 13a which is fastened to the slidable support 17 which again may be moved longitudinally on a fixed support 18 which is fastened to machine table 10. The cutter 14 is fastened to the arbor 13 by means of the usual precision-type screw and nut 19 with washer 19a. The indexing device 15 is movable on the ways 20 and has an adjustable pawl 21 which may be set to engage a tooth 22 of the cutter 14, see FIG. 2. The pawl 21 is made of adjustable length to fit various types of cutters of differing diameters. The operation of the pawl is by the linkage placed under the table 10 which will be described in detail below.

The grinding heads 11 and 12 have grinding wheels 23 and 24, respectively, which are mounted upon the spindles driven by pulleys 25 and 26 connected by belts to motors, not shown. The grinder head 11 containing the spindle carrying grinding wheel 23 and pulley 25 is slidably mounted upon the ways 27, while the grinding head 12 is similarly mounted upon the ways 28, see FIG. 1. An adjustable push-rod 29 is movably connected to the grinding head 11 at point 30. A similar adjustable push-rod 31 is connected to the grinding head 12 at the point 32. A cross bar 33 is connected to a pair of slidable bushings 36 and 37, slidable on the bars 36a and 37a respectively. Said bars are fixed in the mounting plate 16a which is fastened upon the machine table 10 and comprises a part of the drive 16. The push-rods 29 and 31 are hingedly connected at both ends so as not to bind when moved in an axial direction by the oscillations of cross bar 33. The cam drive furthermore consists of a motor shaft 39 which is driven from a motor located under the machine table 10 and not illustrated, see FIG. 2. The cam shaft 39 is journalled in bearings 40 and 41 and drives the cam 38 which is fastened upon the upper end of shaft 39. A cam follower 48 is fastened to the cross members 33 and is in intimate engagement with the cam 38 so that when the same is rotated, the cross bar 33 will be moved in sliding motion on the bushings 36 and 37 with spring return. The return operation is effected by springs 36a and 37a placed upon rods 36a and 37a and the bushings 36 and 37. The cam 38 is mounted upon a vertical shaft 39 which is motor-driven by a built on pulley 39a. The motor is not shown. This shaft 39 furthermore, carries 3 cams, 38, 38a, and 38b, and is journaled in the bearings 40 and 41, see FIGURE 2. Cam 38 through cam-follower 48 operates the cross bar, or yoke 33, which gives an oscillating motion to the grinding heads 11 and 12. The cam 38a is operating the stop mechanism which will be described below, and cam 38b operates the linkage which moves pawl 21.

The grinding heads 11 and 12 are widely adjustable by the fact that the slide ways 27 and 28 are mounted upon a plate 42 which is adjustable up and down by means of a fixed plate and adjusting screws 44, 45, and 46, see FIGURES 2 and 3. In this manner the heads can be adjusted to grind cutters of small and large diameter and small and large face. The entire assembly being fixed upon machine table 10 by means of booths 44 and 47.

As stated supra the pawl 21 mounted upon the slide 15 is driven by cam 38b by means of the linkage 52 and cam-follower 48b. The linkage 52 is split at 53a and has a spring 53 holding the 2 pieces together. With the piece 52a sliding in a guide and being integrally connected with the sliding piece 15 which carries the pawl 21. On the other side of cutter 14, there is a stop 51 which is slidable in the fixed guide-ways 49 and which is movable in two directions by means of 51a and 51b. The vertical, double-ended lever 51a has a spring 51d fastened at one end of same with the other end of the spring rigidly fastened to the base at 51e.

In FIGURE 3 is shown in detail how the grinding wheels 23 and 24 adjust longitudinally along their axes. The spindles carrying the grinding wheels 23 and 24 are mounted in sleeves 53 and carry a shoulder washer 54 at one end. A spring 55 is placed over sleeve 53 and over the shoulder of washer 54 and under compression, thereby leaving the spindle free to move longitudinally for adjustment. An adjustment screw 56 having fine threads is rotatable in brackets 57 by means of a 24 pitch gear 58 which is used as a knob and also as an index. Engaged with the gear 60 is the pawl 59 which also acts as an adjustable stop. The pawl 59 is connected to arm 63 under solenoid 64 which is mounted upon a bracket 65. The solenoid may be operated in known fashion by a simple switch and a battery or other electrical connection. Each time the solenoid is energized it will move the gear 58 by the amount of one tooth 60. The threads 56 and the number of teeth 60 are in such relation that one tooth movement will move the grinding wheel $1/10,000$ of an inch. Obviously other values can be obtained by changing the gear.

The operation of my invention is as follows: The cutter 14 which is to be sharpened is fastened upon the arbor 13 in the conventional manner. The two grinding heads 11 and 12 are thereupon individually adjusted to the right angle of grinding required by the cutter to be ground. This is taken care of by loosening screws 44 as described supra. Stop 51 is engaged with the cutter 14 to prevent any motion of same while one tooth is being ground. After the compound angle has been set, the bolts 29 and 31 are adjusted to bring the cross bar 33 into engagement with the cam-follower 48. The motors driving the grinding heads and the motor driving the shaft 39 are now started. The cam-follower 48 will push the cross bar 33 inward towards the grinding wheels so that the two grinding heads 11 and 12 will move on slides 27 and 28, respectively, and the grinding wheels 23 and 24 will do their work upon the cutter 14. At the end of the stroke the cam 38 and cam-follower 48 will start to move away and the cross bar 33 will be pushed away from the grinding head by means of the coil springs 36b and 37b on slides 36a and 37a. If this is the first cutter ground under a given size the operator will now check the first cut and will make adjustments of grinding heads 11 and 12 by turning gears 58 as described supra. When one tooth is finished, the operator will let the machine work automatic. As soon as the grinding heads 11 and 12 have moved away cam 38a and slide 51b, and lever 51a will move stop 51 out of an engagement with the cutter. At the same time the cam 38b with its cam-follower will operate the linkage 52 and 52a as described supra to make pawl 21 advance the cutter one tooth. A stop 51 now moves in and prevents the cutter from moving. The same operations now are repeated on the second tooth and so on until the cutter is finished. This can be automatic and the operator may, thereby, handle other machines in the meantime. The cams are so adjusted to each other that the proper operations will commence at the proper time.

It is to be understood that the form of my invention hereby shown and described, is to be taken as a preferred example of same, and that various changes in the shape, size, and arrangement of parts may be resorted to without departing from the spirit of my invention or the scope of the sub-joined claims.

Having thus described my invention, I claim:

1. In an automatic cutter grinder, means for supporting a cutter independently and rotatably mounted upon a machine table; two rotary grinding heads mounted on said table with their axes nearly parallel to the axes of the cutter to be ground but at a certain radial distance from same, said grinding heads being individually adjustable as to grinding angle and relation of said cutter and also being slidable radially toward said cutter on individual sliding ways; a cross bar hingedly connected between said grinding heads; a motor-driven shaft having a first cam thereon and a cam follower on said cross bar so arranged as to slide said grinding heads in unison; a second cam and cam follower driven by the same cam shaft operating a stop device preventing said cutter from moving while being ground, and a third cam and cam follower with associated linkage operating an indexing mechanism which will advance the cutter one tooth after a given tooth has been ground.

2. An automatic cutter grinder such as described in claim 1 in which said grinding heads are equipped with a solenoid operated adjusting mechanism for adjusting the depth of the cut, said mechanism consisting of a coil spring extending from the bearing of the grinding head; a shoulder washer covering the outer end of said spring; a heavy adjustment screw turnable in a bracket and located in the axis of the grinding spindle, said adjustment screw having a fine thread, a gear on its outer end and an industrial diamond situated in the center of its inner end opposing a similar industrial diamond located in the end of said grinding spindle, whereby the turning of said gear will move the grinding wheel axially; a solenoid mounted adjacent to said gear and being adapted to operate a pawl running on said gear, whereby fine adjustments of the cut may be made.

References Cited by the Examiner

UNITED STATES PATENTS

| | | | |
|---|---|---|---|
| 407,721 | 7/1889 | Cox | 51—225 X |
| 1,042,817 | 10/1912 | Newman | 51—56 |
| 1,875,163 | 8/1932 | Scharff | 51—225 X |

HAROLD D. WHITEHEAD, *Primary Examiner.*